United States Patent [19]

Teramachi

[11] Patent Number: 4,518,206
[45] Date of Patent: May 21, 1985

[54] LINEAR SLIDE ROLLER BEARING UNIT

[76] Inventor: Hiroshi Teramachi, 2-34-8, Higashi-Tamagawa, Setagaya-Ku, Tokyo, Japan

[21] Appl. No.: 614,206

[22] Filed: May 25, 1984

[51] Int. Cl.³ .............................................. F16C 29/06
[52] U.S. Cl. ..................................... 308/6 C; 308/6 R
[58] Field of Search ............... 308/6 C, 6 R, 3 A, 3 R

[56] References Cited
U.S. PATENT DOCUMENTS

| 4,296,974 | 10/1981 | Teramachi | 308/6 C |
| 4,302,059 | 11/1981 | Teramachi | 308/6 C |
| 4,396,235 | 8/1983 | Teramachi | 308/6 C |
| 4,428,627 | 1/1984 | Teramachi | 308/6 C |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

A linear slide roller bearing unit having a pair of track shafts being constituted by a block member with a substantially triangular cross-section having loaded roller rolling surfaces formed on both side surface portions of a ridge orthogonally projecting from the center of an outer inclined surface portion thereof. A movable table of substantially U-shaped cross-section being provided with a pair of bearing bodies of substantially triangular cross-section which are screwed to corresponding recesses in the movable table, each bearing body having a pair of guide ridges each having one side surface defined as a loaded roller rolling surface confronting the corresponding loaded roller rolling surface of the associated track shaft and the other side surface defined as a non-loaded roller rolling surface. Barrel-shaped or cylindrical rollers recirculate along the rolling surfaces of the bearing bodies and contact the loaded roller rolling surfaces on the track shafts. A roller retainer is attached to each of the guide ridges so as to face the corresponding inner inclined surface portion of the associated bearing body and is adapted to guide the rollers so that they can recirculate through the space defined between the roller retainer and inner inclined surface portion. The rollers in the state of serving as loaded rollers are brought into the contact with the loaded roller rolling surfaces on the track shafts at a contact angle of about 45 degrees.

6 Claims, 34 Drawing Figures

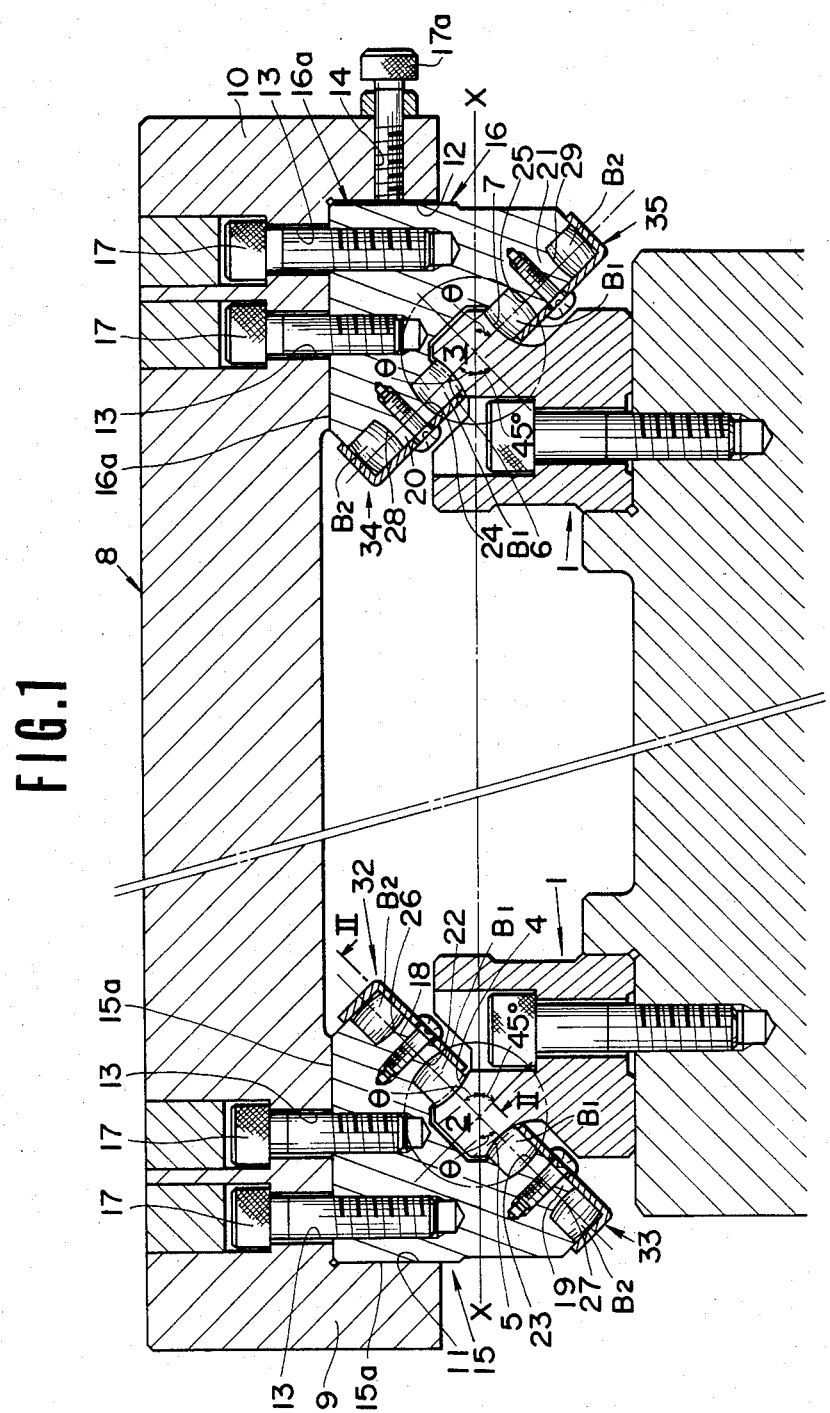

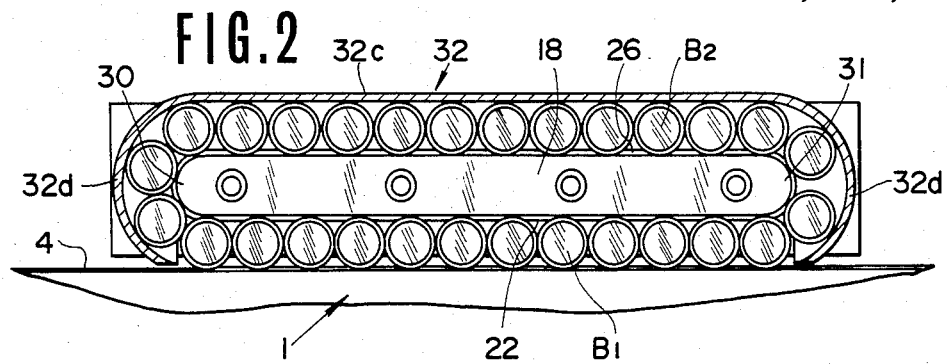
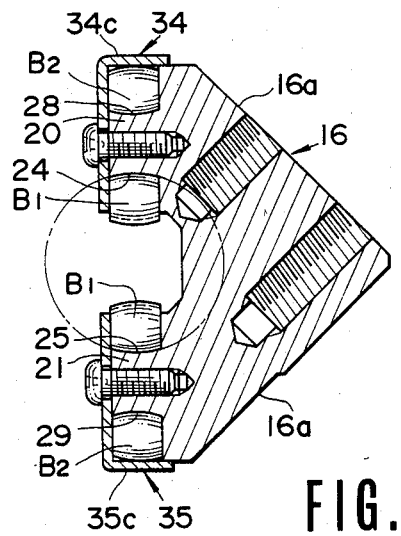
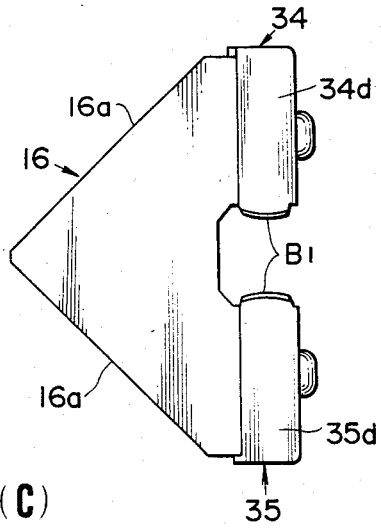
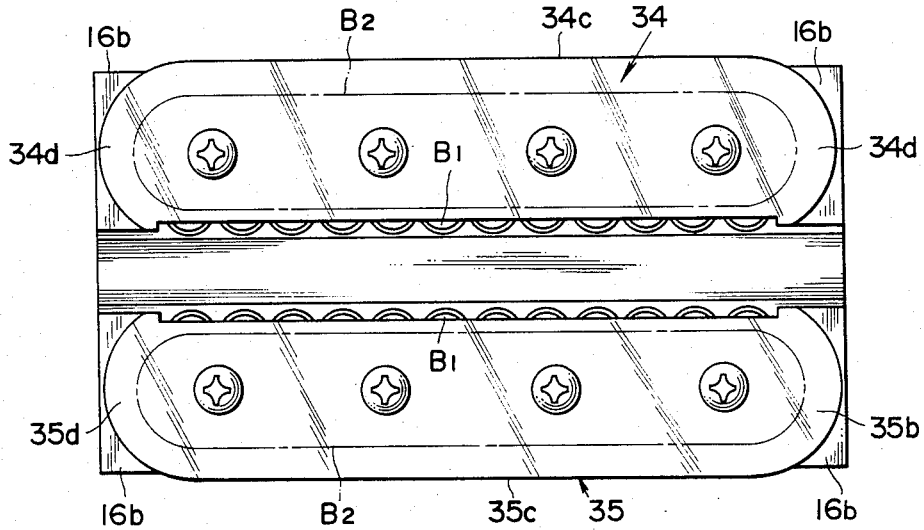

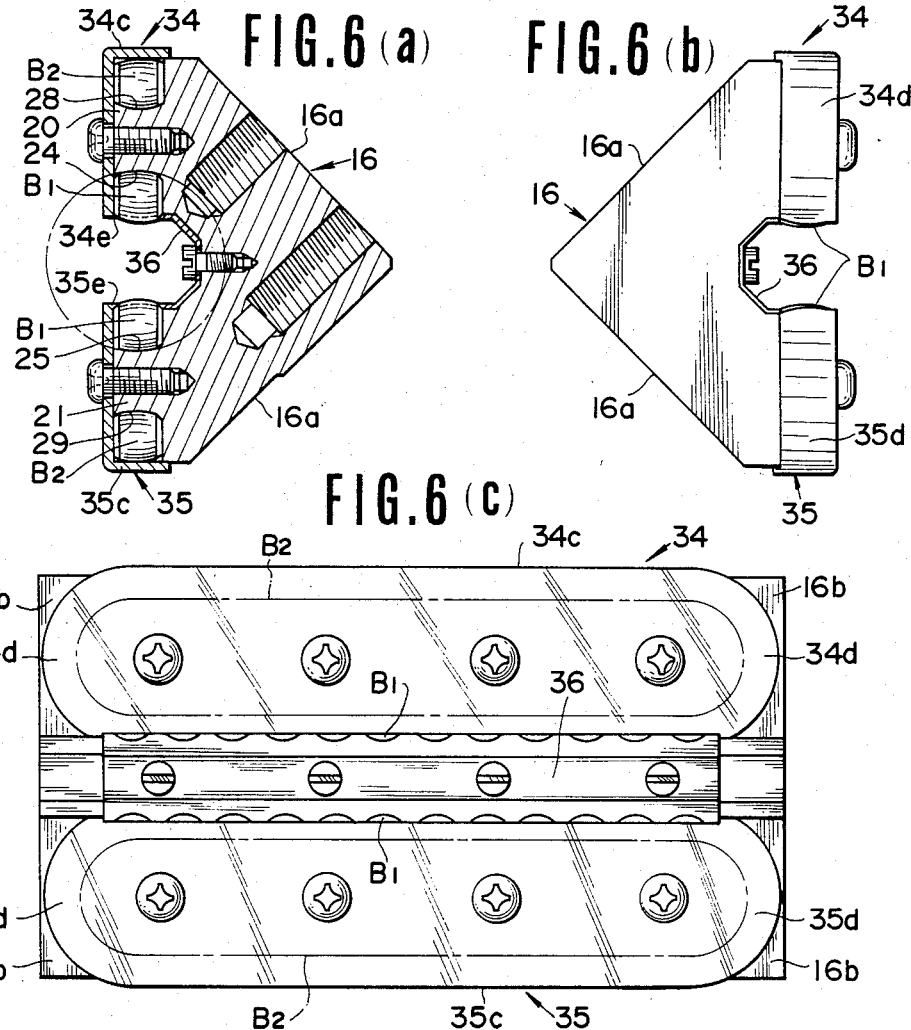
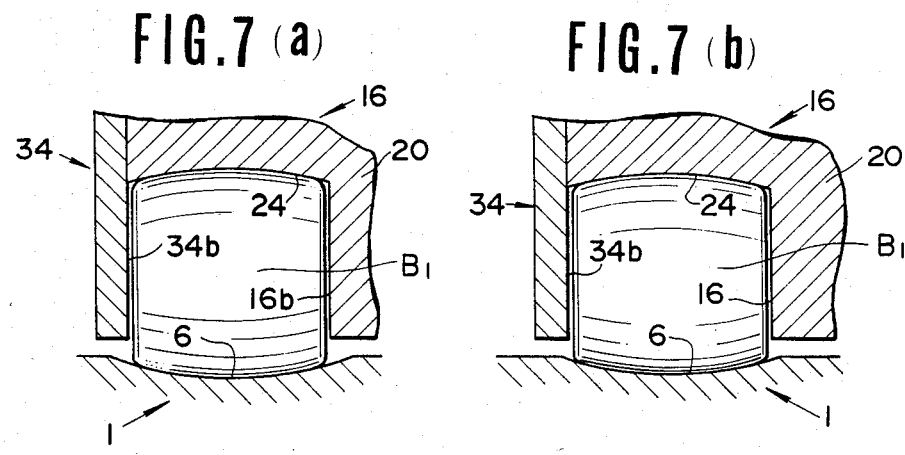

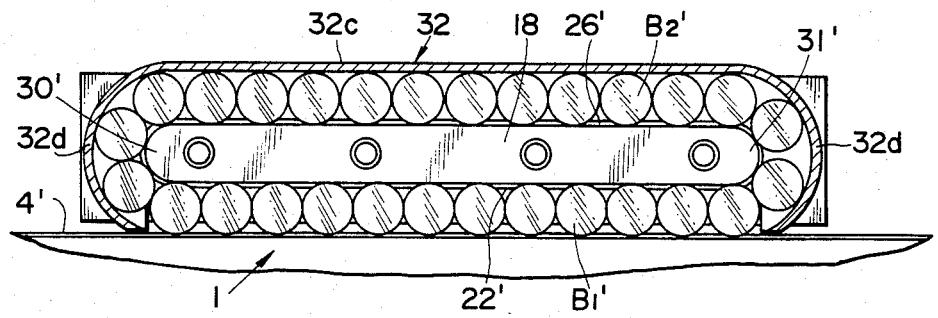
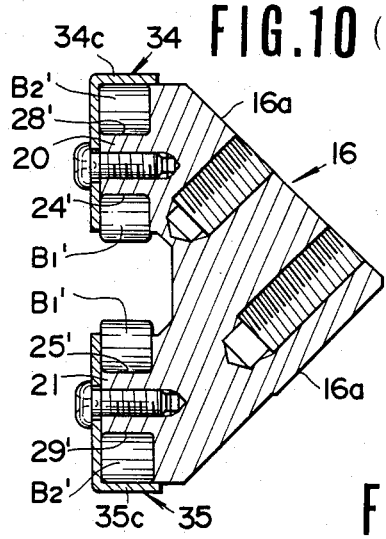 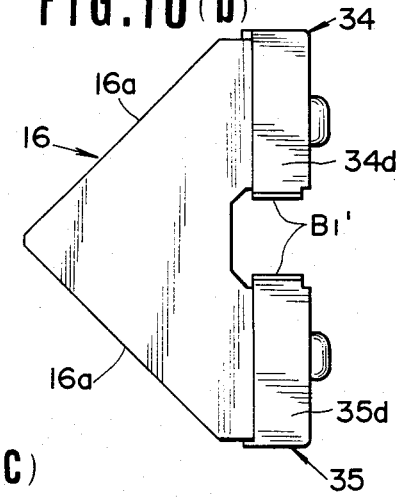
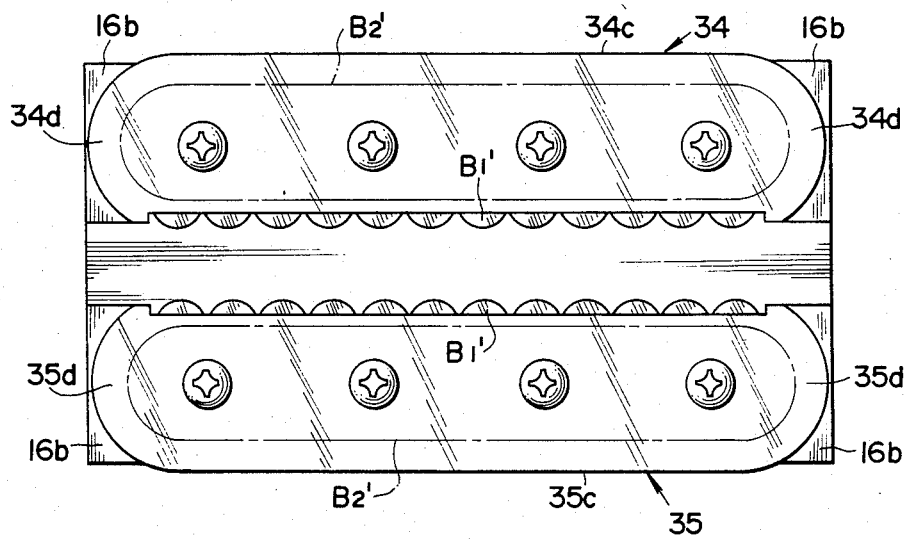

LINEAR SLIDE ROLLER BEARING UNIT

BACKGROUND OF THE INVENTION

The present invention relates to a linear slide roller bearing unit suitable for use in various sliding parts such as the table saddle of a machine tool, the slider of a machining center and the slider of a transportation robot for reciprocative transportation of a heavy object.

Generally, a conventional linear slide roller bearing unit of this type has been constructed such that a bearing body of channel-like cross-section is slidably mounted on a track shaft of substantially trapezoidal cross-section through one row of cylindrical rollers. The thus constructed roller bearing unit is, however, disadvantageously unable to cope well with loads applied in upward and radial directions. In addition, since a roller rolling groove for guiding the recirculation of the cylindrical rollers is directly formed in each skirt portion of the bearing body, it is inconveniently difficult to effect turning and grinding operations when forming the roller rolling groove. Further, the construction of the conventional linear slide roller bearing unit unfavorably makes it impossible to adjust the preload applied to the cylindrical rollers interposed between the roller rolling groove on the bearing body and the corresponding roller rolling groove on the track shaft.

SUMMARY OF THE INVENTION

Under these circumstances, the invention aims as its primary object at overcoming the above-described problems of the prior art.

Accordingly, it is an object of the invention to provide a linear slide roller bearing unit capable of satisfactorily bearing not only loads applied in upward and radial directions but also loads applied in all directions.

It is another object of the invention to provide a linear slide roller bearing unit which facilitates the machining of the roller rolling groove and makes it possible to freely adjust the preload applied to the rollers within the loaded region.

To these ends, according to one aspect of the invention, there is provided a linear slide roller bearing unit comprising: a pair of right and left track shafts extending in the longitudinal direction of the linear slide roller bearing unit, each track shaft being constituted by a block member with a substantially triangular cross-section having loaded roller rolling surfaces formed on both side surface portions of a ridge orthogonally projecting from the center of an outer inclined surface portion thereof; a movable table constituted by a long block member of substantially U-shaped cross-section disposed so as to straddle the track shafts, the movable table being provided with longitudinal recesses respectively formed in the opposing inner surfaces of skirt portions thereof; a pair of right and left bearing bodies each constituted by a long block member of substantially triangular cross-section which is screwed to the corresponding recess in the movable table, each bearing body having a pair of guide ridges respectively projecting from both side edges of an inner inclined surface portion of the block body, each guide ridge having one side surface thereof defined as a loaded roller rolling surface confronting the corresponding loaded roller rolling surface of the associated track shaft and the other side surface defined as a non-loaded roller rolling surface; barrel-shaped rollers adapted to be recirculated along the loaded roller rolling surfaces and non-loaded roller rolling surfaces of the bearing bodies and to come in contact with the loaded roller rolling surfaces on the track shafts when rolling along the loaded roller rolling surfaces on the bearing bodies; and a roller retainer attached to each of the guide ridges so as to face the corresponding inner inclined surface portion of the associated bearing body and adapted to guide the rollers so that they can recirculate through the space defined between the roller retainer and inner inclined surface portion, wherein the rollers in the state of serving as loaded rollers are brought into contact with the loaded roller rolling surfaces on the track shafts at a contact angle of about 45°, within the same plane, with respect to corresponding imaginary oblique lines each passing through the center of the ridge of the associated track shaft and intersecting the horizontal axis of the linear slide roller bearing unit at an angle of about 45°.

It is to be noted that the above-mentioned barrel-shaped rollers may be replaced by cylindrical rollers.

These and other objects, features and advantages of the invention will become clear from the following description of the preferred embodiments thereof taken in conjunction with the accompanying drawings.

BRIEF DESCRIPTION OF THE DRAWINGS

The accompanying drawings in combination show embodiments of the linear slide roller bearing unit in accordance with the invention, in which:

FIG. 1 is a front elevational view of an embodiment of the linear slide roller bearing unit in accordance with the invention;

FIG. 2 is an obliquely cut sectional view taken along the line, II—II of FIG. 1;

FIG. 3(a) is a vertical sectional view of a bearing body retaining rolling rollers through roller retainers, taken through an intermediate portion thereof in the longitudinal direction;

FIG. 3(b) is a front elevational view of an end portion of the bearing body;

FIG. 3(c) is a side elevational view of the bearing body;

FIG. 6(a) is a vertical sectional view of a bearing body equipped with roller retainers in accordance with a modification of the linear slide roller bearing unit, taken through an intermediate portion thereof in the longitudinal direction;

FIG. 6(b) is a front elevational view of an end portion of the bearing body shown in FIG. 6(a);

FIG. 6(c) is a side elevational view of the bearing body shown in FIG. 6(a);

FIGS. 7(a), 7(b) show how each loaded roller contacts the track shaft;

FIG. 9 is an obliquely cut side elevational view taken along the line IX—IX of FIG. 8;

FIG. 10(a) is a vertical sectional view of a bearing body retaining rolling rollers through roller retainers in the linear slide roller bearing unit shown in FIG. 8, taken through an intermediate portion thereof in the longitudinal direction;

FIG. 10(b) is a front elevational view of an end portion of the bearing body shown in FIG. 10(a);

FIG. 10(c) is a side elevational view of the bearing body shown FIG. 10(a);

DESCRIPTION OF THE PREFERRED EMBODIMENTS

The linear slide roller bearing unit of the invention will be described hereinunder through embodiments thereof with reference to the accompanying drawings.

Figure 4A:
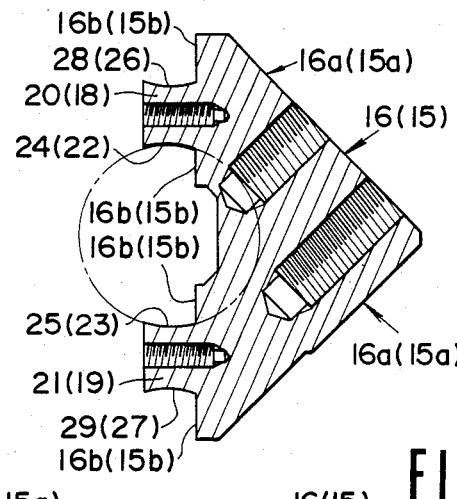
FIG. 4(a) is a vertical sectional view of a bearing body, taken through an intermediate portion thereof in the longitudinal direction.
Figure 4B:
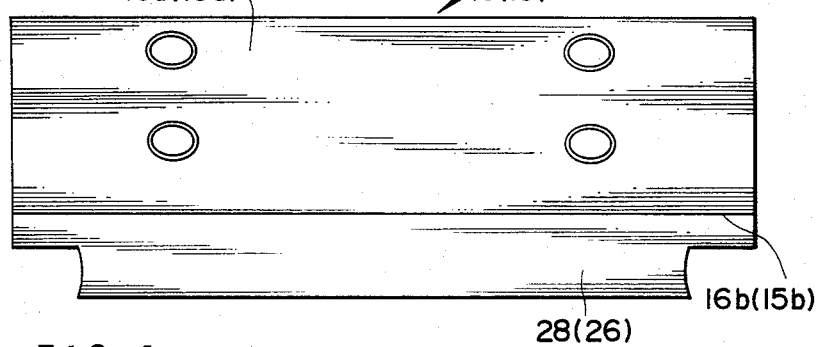
FIG. 4(b) is a plan view of the bearing body.
Figure 4C:
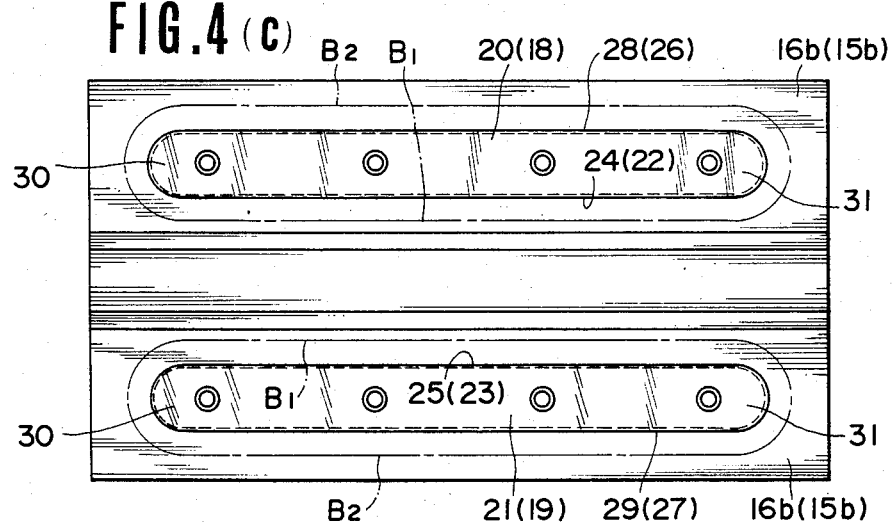
FIG. 4(c) is a side elevational view of the bearing body.
Figure 5A:
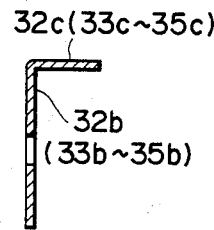
FIG. 5(a) is a vertical sectional view of a roller retainer, taken through an intermediate portion thereof in the longitudinal direction.
Figure 5B:
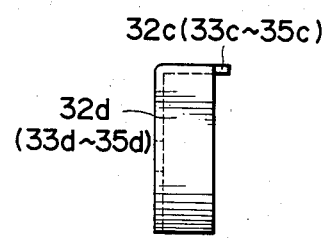
FIG. 5(b) is a front elevational view of an end portion of the roller retainer.
Figure 5C:
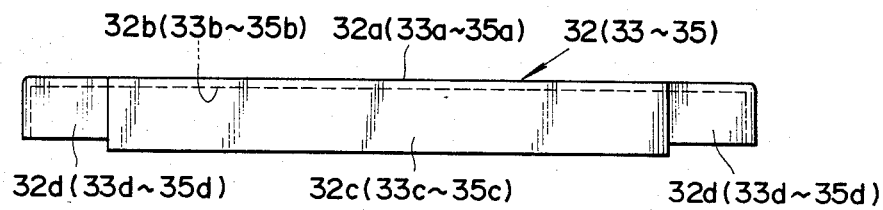
FIG. 5(c) is a plan view of the roller retainer.
Figure 5D:
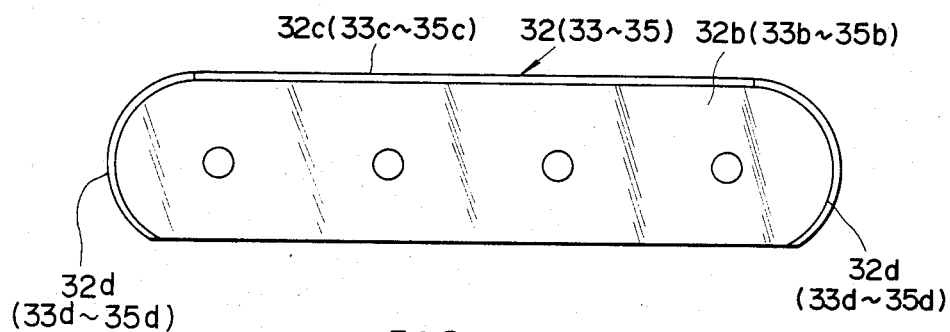
FIG. 5(d) is a side elevational view of the roller retainer.
Figure 5E:
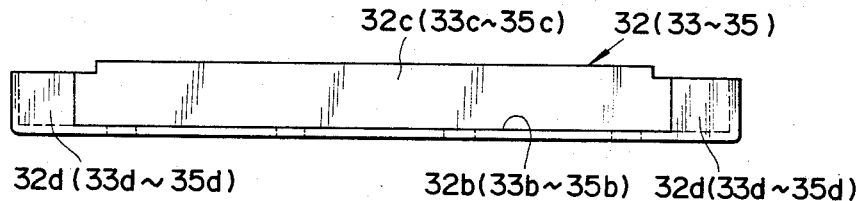
FIG. 5(e) is a bottom view of the roller retainer.

Referring first to FIGS. 1 to 7, which in combination show an embodiment of the linear slide roller bearing unit in accordance with a first aspect of the invention, a pair of right and left track shafts 1, 1 are attached to a fixed bed, for example, and extend in the longitudinal direction of the fixed bed. Each track shaft 1 is constituted by a block member having a substantially triangular cross-section. The track shaft 1 (1) is provided with loaded roller rolling surfaces 4, 5 (6, 7) which are symmetrically formed on both side surfaces of a ridge 2 (3) orthogonally projecting from the center of an outer inclined surface of the block member. Each of the loaded roller rolling surfaces 4 to 7 is constituted by a spherical surface equal in shape to the outer peripheral surface of each roller B having a barrel shape.

A long movable table 8 is constituted by a block member of substantially U-shaped cross-section and is disposed so as to straddle the track shafts 1. The movable table 8 has longitudinal recesses 11, 12 formed in the opposing inner surfaces of skirt portions 9, 10 thereof. Through holes 13, 13 are bored through the ceiling portion of the movable table 8 such as to be located on the inside of the recesses 11, 12. A tapped hole 14 is bored through one skirt portion 10 such that it opens on the inside face of one recess 12.

A pair of left and right bearing bodies 15, 16 are respectively interposed between the corresponding track shafts 1 and the skirt portions 9, 10 of the movable table 8. Each of the bearing bodies 15, 16 is constituted by a block member which extends in the longitudinal direction of the movable table 8 and has a substantially triangular cross-section. The bearing bodies 15, 16 have their outer inclined surface portions 15a, 15a, 16a, 16a retained within the corresponding recesses 11, 12 by being secured with fixing members such as bolts 17, 17, 17, 17 fitted into the respective through holes 13, 13, 13, 13 from the upper face of the ceiling portion. It is to be noted that a bolt 17a screwed into the tapped hole 14 is employed to adjust a preload. The bearing bodies 15, 16 are provided along both side edges of inner inclined surface portions 15b, 15b, 16b, 16b with guide ridges 18 to 21 having a track-like (oval) planar shape and extending in the longitudinal direction of the bearing bodies 15, 16. Loaded roller rolling surfaces 22 to 25 are formed on one of the side surfaces of the guide ridges 18 to 21 opposing the corresponding track shafts 1. The loaded roller rolling surfaces 22 to 25 longitudinally extend in parallel to the corresponding loaded roller rolling surfaces 4 to 7 on the track shafts 1. On the other hand, the guide ridges 18 to 21 are provided on their other side surfaces with non-loaded roller rolling surfaces 26 to 29 longitudinally extending in parallel to the corresponding loaded roller rolling surfaces 22 to 25. The rolling surfaces 22 to 25 are communicated with their corresponding rolling surfaces 26 to 29 through semicircular roller turning portions 30, 30, 31, 31 formed on both end surfaces of each of the guide ridges 18 to 21, thereby constituting four roller recirculating passages. Each of the loaded roller rolling surfaces 22 to 25, the non-loaded roller rolling surfaces 26 to 29 and the roller turning portions 30, 30, 31, 31 is constituted by a spherical surface corresponding to the outer spherical surface of the rollers B each of which has a barrel shape.

Loaded rollers $B_1$ are in contact with the corresponding loaded roller rolling surfaces 4 to 7 and 22 to 25 on the track shafts 1 and the bearing bodies 15, 16 as shown in FIG. 1. More specifically, the loaded rollers $B_1$ are in contact with the corresponding loaded roller rolling surfaces 4 to 7 on the track shafts 1 at a contact angle $\theta$ of about 45°, within the same plane, with respect to an imaginary oblique line passing through the center of each of the ridges 2, 3 of the track shafts 1 and intersecting the horizontal axis X—X at an angle of about 45°. The bearing unit is, therefore, able to bear loads applied in all directions, that is, vertical, horizontal and radial directions. Further, as shown in FIG. 7, the curvature of each of the loaded roller rolling surfaces 4 to 7 and 22 to 25 may be made larger than that of the loaded roller $B_1$ (see FIG. 7(a)). It is also possible to make the curvature of each loaded roller rolling surface equal to that of the loaded roller $B_1$ (see FIG. 7(b)). In such case, the former is advantageously able to provide a larger load bearing capacity and a better automatic aligning function.

Roller retainers 32 to 35 are screwed to the respective guide ridges 18 to 21 of the bearing bodies 15, 16 so as to be parallel to the corresponding inner inclined surface portions 15b, 15b, 16b, 16b. The barrel-shaped rollers B are accommodated and retained in the spaces defined between the inner inclined surface portions 15b, 15b, 16b, 16b of the bearing bodies 15, 16 and the corresponding inner surface portions 32b to 35b of the roller retainers 32 to 35 so that both end surfaces of each roller B come in parallel contact with the corresponding surface portions. Thus, a plurality of barrel-shaped rollers B effect recirculation while rotating around their own axes along the loaded roller rolling surfaces 22 to 25 and the non-loaded roller rolling surfaces 26 to 29 of the bearing bodies 15, 16. As will be clearly seen from FIG. 7, the barrel-shaped rollers B, which effect recirculation, have both their end surfaces retained through slight gaps by the inner inclined surface portions 15b, 15b, 16b, 16b of the bearing bodies 15, 16 and the inner surface portions 32b to 35b of the roller retainers 32 to 35. Therefore, it is possible to prevent any skew (oscillation of the longitudinal axes) of the rollers, thereby making it possible to ensure smooth running of the movable table 8.

The roller retainers 32 to 35 thus serve to allow the barrel-shaped rollers B to be properly recirculated. For this reason, as shown in FIG. 5, the roller retainers 32 to 35 are respectively constituted by cover members 32a to 35a each having a substantially track-like planar shape and totally opened at one of their linear portions. Moreover, the cover members 32a to 35a respectively have linear slide guide portions 32c to 35c for guiding non-loaded rollers B$_2$ and curvilinear slide guide portions 32d to 35d continuously with both respective ends of the linear slide guide portions 32c to 35c for the purpose of guiding the barrel-shaped rollers B as they turn. It is to be noted that since the loaded rollers B$_1$ come in contact with the loaded roller rolling surfaces 4 to 7 on the track shafts 1, 1 while partially projecting from the roller retainers 32 to 35, the sides of the roller retainers 32 to 35 opposite to the linear slide guide portions 32c to 35c for guiding the non-loaded rollers B$_2$ are opened over the entire lengths thereof.

Further, in order to prevent the loaded rollers B$_1$ from coming off and to facilitate the assembling of the bearing unit, according to the invention, retaining projections 32e to 35e for retaining the outer periphery of each barrel-shaped roller B are respectively provided at the free ends of the inner surface portions 32b to 35b of the roller retainers 32 to 35. In addition, mounting members 36, 36 of substantially U-shaped cross-section are provided which are respectively screwed to the inner recesses of the bearing bodies 15, 16 at intermediate positions between a pair of roller retainers 32, 33 and between another pair of roller retainers 34, 35. The mounting members 36, 36, which extend longitudinally, serve to rollably retain the inner periphery of each barrel-shaped roller B.

Figure 8:
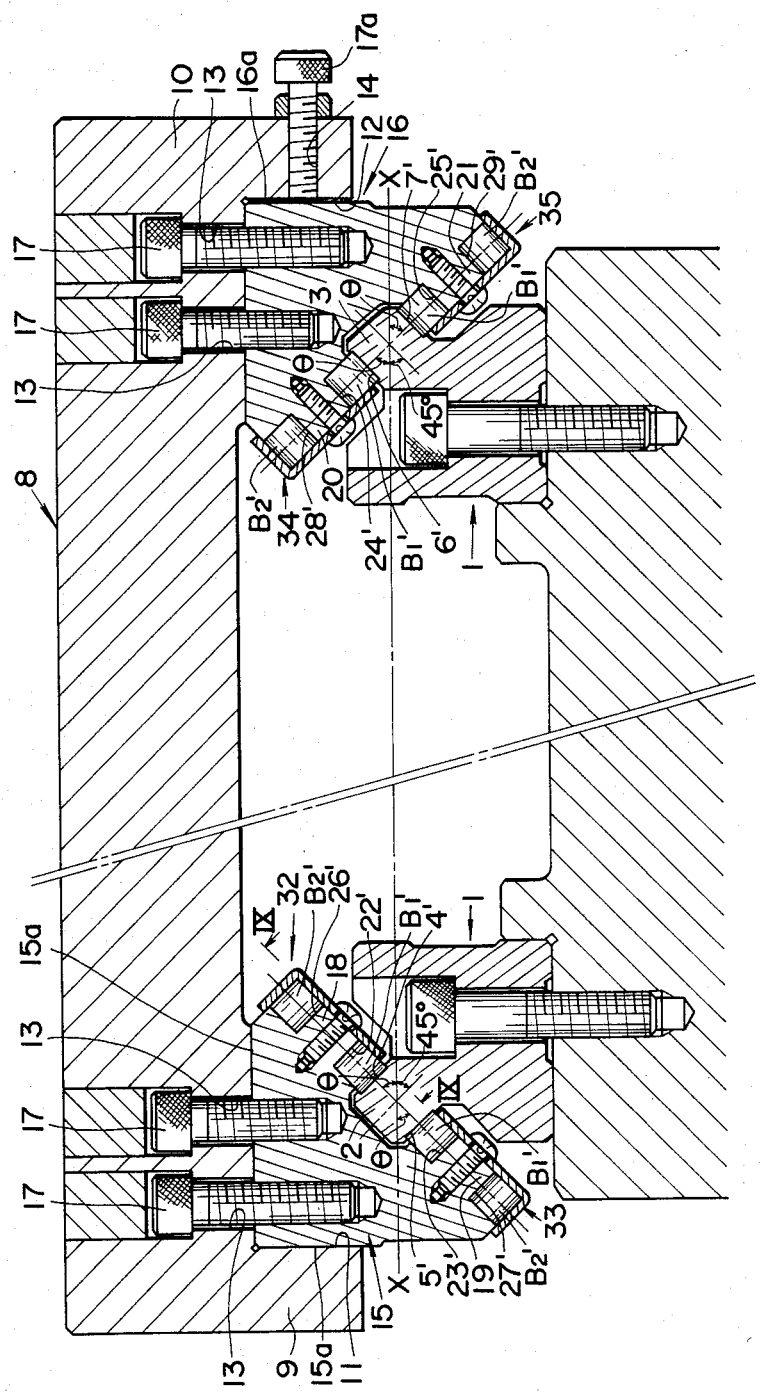
FIG. 8 is a front elevational view of another embodiment of the linear slide roller bearing unit in accordance with the invention.
Figure 11A:
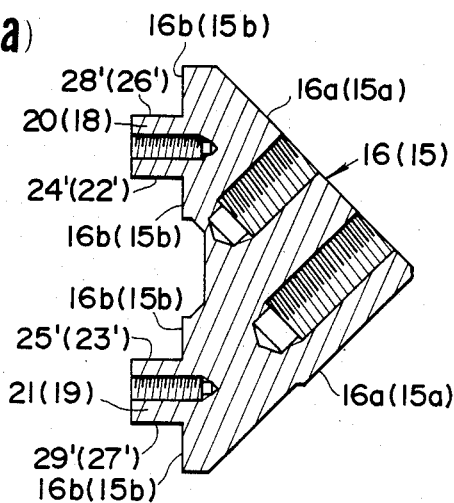
FIG. 11(a) is a vertical sectional view of a bearing body of the linear slide roller bearing unit shown in FIG. 8, taken through an intermediate portion thereof in the longitudinal direction.
Figure 11B:
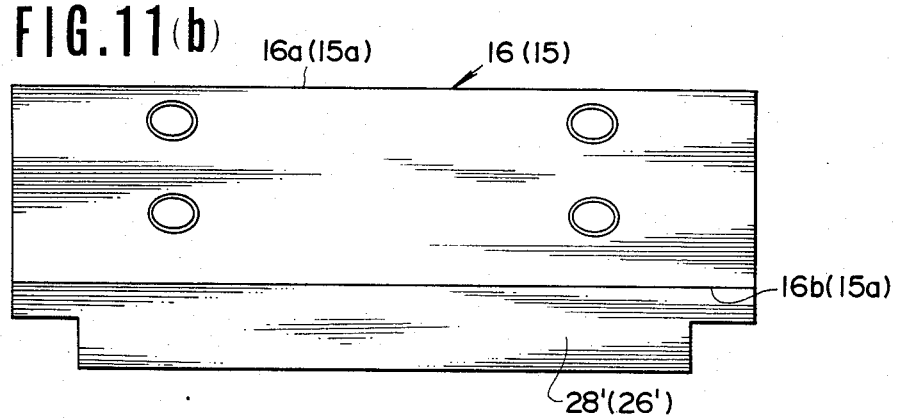
FIG. 11(b) is a plan view of the bearing body shown in FIG. 11(a)
Figure 11C:
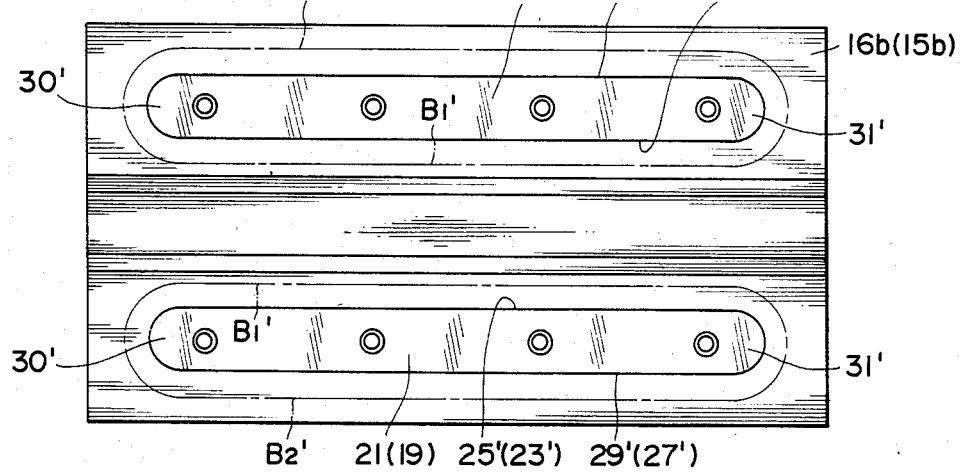
FIG. 11(c) is a side elevational view of the bearing body shown in FIG. 11(a)
Figure 12A:
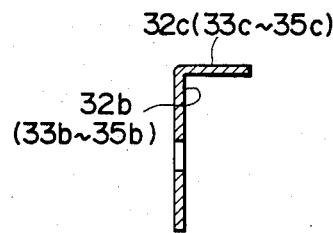
FIG. 12(a) is a vertical sectional view of a roller retainer of the linear slide roller bearing unit shown in FIG. 8, taken through an intermediate portion thereof in the longitudinal direction.
Figure 12B:
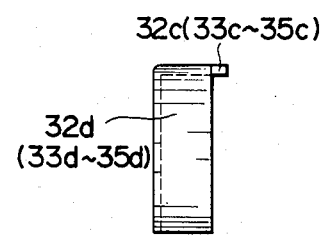
FIG. 12(b) is a front elevational view of an end portion of the roller retainer shown in FIG. 12(a)
Figure 12C:
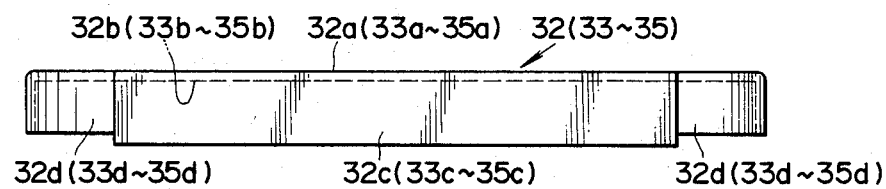
FIG. 12(c) is a plan view of the roller retainer shown in FIG. 12(a)
Figure 12D:
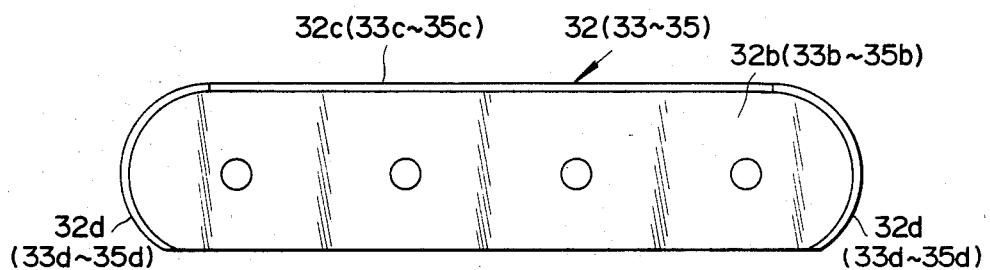
FIG. 12(d) is a side elevational view of the roller retainer shown in FIG. 12(a)
Figure 12E:
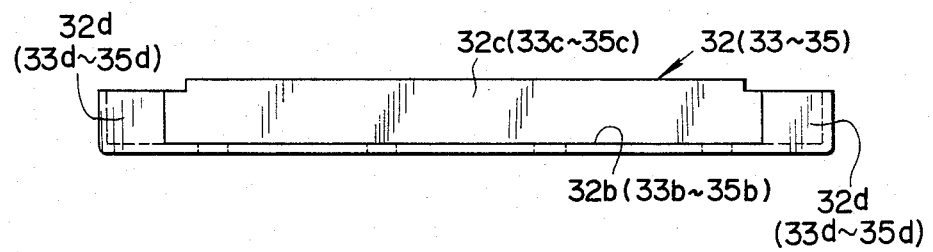
FIG. 12(e) is a bottom view of the roller retainer shown in FIG. 12(a)
Figure 13A:
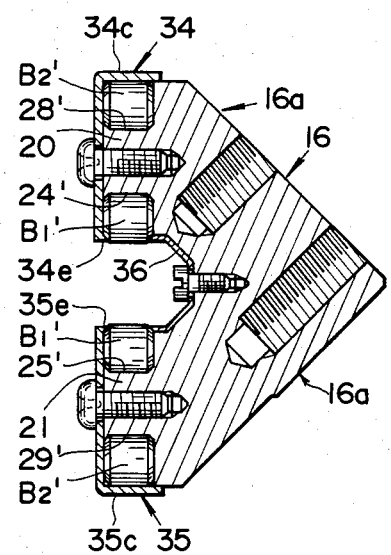
FIG. 13(a) is a vertical sectional view of a bearing body equipped with roller retainers in accordance with a modification of the linear slide roller bearing unit shown in FIG. 8, taken through an intermediate portion thereof in the longitudinal direction.
Figure 13B:
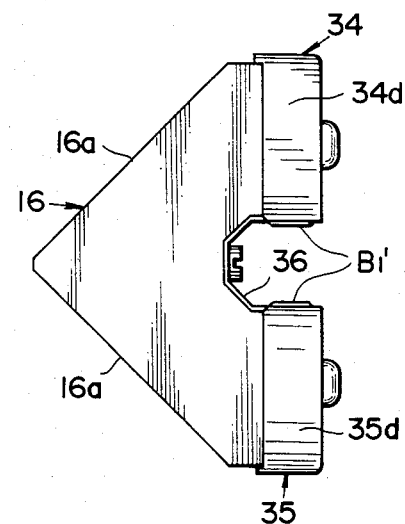
FIG. 13(b) is a front elevational view of an end portion of the bearing body shown in FIG. 13(a)
Figure 13C:
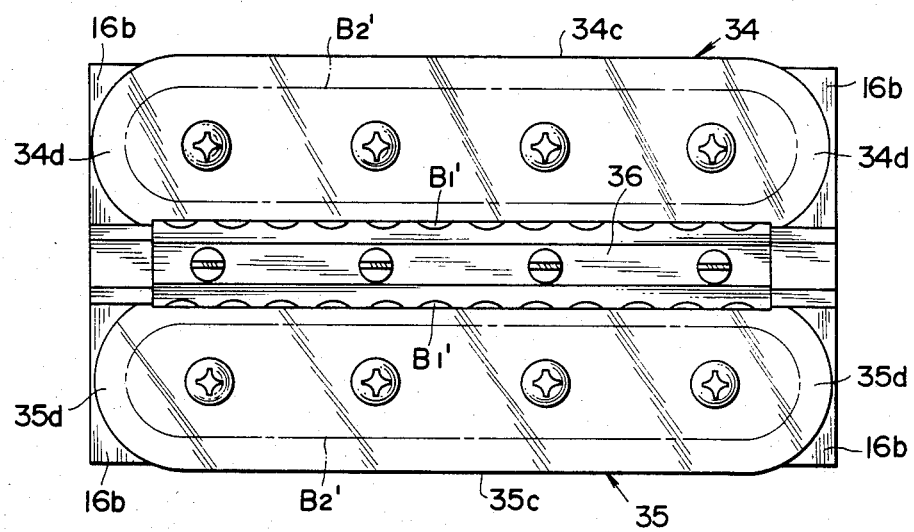
FIG. 13(c) is a side elevational view of the bearing body shown in FIG. 13(a).

FIGS. 8 to 13 in combination show another embodiment of the linear slide roller bearing unit in accordance with a second aspect of the invention, in which the same constituent parts in the embodiment in accordance with the second aspect of the invention as those in the above-described embodiment are denoted by the same reference numerals. Unlike the barrel-shaped rollers B in the first-described embodiment, cylindrical rollers B' are employed in this embodiment. The construction and operation of this embodiment are the same as those in the first-described embodiment except that in correspondence with the shape of the rollers B', a flat surface is employed to constitute each of the loaded roller rolling surfaces 4' to 7' of the track shafts, the loaded roller rolling surfaces 22' to 25', the non-loaded roller rolling surfaces 26' to 29' and the roller turning portions 30', 31' of the bearing bodies.

The difference in effect between the barrel-shaped roller and the cylindrical roller employed as a rolling element will be described hereinunder with reference to FIG. 7. The barrel-shaped roller B has a larger load bearing capacity and a better aligning function than the cylindrical roller B'. More specifically, in the case of the barrel-shaped roller B, since a spherical surface is employed to constitute both the outer peripheral surface of the loaded roller B$_1$ and each of the loaded roller rolling surfaces 4 to 7 and 22 to 25, the loaded roller B$_1$ is in point or line contact with the loaded roller rolling surfaces 4 to 7 and 22 to 25 and therefore elastically deformed when a load is applied thereto to allow an increase in its load bearing capacity. In addition, the loaded roller B$_1$ in point or line contact with the loaded roller rolling surfaces 4 to 7 and 22 to 25 can oscillate laterally with its central point as a fulcrum and therefore provides an alignment range as large as the oscillation width.

The linear slide roller bearing unit in accordanace with the invention, having the above-described construction and operation, offers the following various advantages:

The linear slide roller bearing unit can satisfactorily bear loads applied in all directions, that is, vertical, horizontal and radial directions, since the loaded rollers are brought into contact with the corresponding loaded roller rolling surfaces on the track shafts at a contact angle of about 45°, within the same plane, with respect to the corresponding imaginary oblique lines each passing through the center of the ridge of the associated track shaft and intersecting the horizontal axis at an angle of about 45°. Further, since the bearing bodies are formed separately from the movable table and are reduced in size, it becomes easy to effect turning and grinding operations when forming the roller rolling surfaces on the bearing bodies. This facilitation of the formation of the roller rolling surfaces makes it possible to reduce the production cost of the bearing bodies. Moreover, the bearing unit can be readily produced and assembled advantageously, since it is possible to instantaneously form spaces in which the loaded and non-loaded rollers are accommodated and moved while rolling simply by attaching the roller retainers to the bearing bodies. Furthermore, it is possible to apply a proper preload (pre-compression) to the loaded rollers simply by adjusting the tightening of each screw used for mounting the bearing bodies, as separate elements, to the movable table. Thus, it is advantageously possible to increase the rigidity of the bearing unit as a whole while ensuring a smooth recirculation of the rollers.

Although the invention has been described by means of specific terms, it is to be noted here that the described embodiments are not exclusive and various changes and modifications may be imparted thereto without departing from the scope of the invention which is limited solely by the appended claims.

What is claimed is:

1. A linear slide roller bearing unit comprising:
   a pair of right and left track shafts extending in the longitudinal direction of said linear slide roller bearing unit, each track shaft being constituted by a block member with a substantially triangular cross-section having loaded roller rolling surfaces formed on both side surface portions of a ridge orthogonally projecting from the center of an outer inclined surface portion thereof;

a movable table constituted by a long block member of substantially U-shaped cross-section disposed so as to straddle said track shafts, said movable table being provided with longitudinal recesses respectively formed in the opposing inner surfaces of skirt portions thereof;

a pair of right and left bearing bodies each constituted by a long block member of substantially triangular cross-section which is screwed to the corresponding recess in said movable table, each bearing body having a pair of guide ridges respectively projecting from both side edges of an inner inclined surface portion of said block body, each guide ridge having one side surface thereof defined as a loaded roller rolling surface confronting the corresponding loaded roller rolling surface of the associated track shaft and the other side surface defined as a non-loaded roller rolling surface;

barrel-shaped rollers adapted to be recirculated along said loaded roller rolling surfaces and non-loaded roller rolling surfaces of said bearing bodies and to come in contact with said loaded roller rolling surfaces on said track shafts when rolling along said loaded roller rolling surfaces on said bearing bodies; and a roller retainer attached to each of said guide ridges so as to face the corresponding inner inclined surface portion of the associated bearing body and adapted to guide said rollers so that they can recirculate through the space defined between said roller retainer and inner inclined surface portion, wherein said rollers in the state of serving as loaded rollers are brought into contact with said loaded roller rolling surfaces on said track shafts at a contact angle of about 45°, within the same plane, with respect to corresponding imaginary oblique lines each passing through the center of said ridge of the associated track shaft and intersecting the horizontal axis of said linear slide roller bearing unit at an angle of about 45°.

2. A linear slide roller bearing unit according to claim 1, wherein each roller retainer is provided at the free end of its inner surface portion with a retaining projection for retaining the outer periphery of each of said barrel-shaped rollers, and wherein each bearing body has a mounting member of substantially U-shaped cross-section screwed to the inner recess thereof at an intermediate position between the associated roller retainers, said mounting member extending longitudinally and serving to rollably retain the inner periphery of each of said barrel-shaped rollers.

3. A linear slide roller bearing unit according to either one of claims 1 or 2, wherein said loaded roller rolling surfaces are communicated with their corresponding non-loaded roller rolling surfaces through semicircular roller turning portions formed on both end surfaces of each of said guide ridges, thereby constituting roller recirculating passages, respectively, and wherein each of said loaded roller rolling surfaces, non-loaded roller rolling surfaces and roller turning portions is constituted by a spherical surface corresponding to the outer spherical surface of said barrel-shaped rollers.

4. A linear slide roller bearing unit comprising:

a pair of right and left track shafts extending in the longitudinal direction of said linear slide roller bearing unit, each track shaft being constituted by a block member with a substantially triangular cross-section having loaded roller rolling surfaces formed on both side surface portions of a ridge orthogonally projecting from the center of an outer inclined surface portion thereof;

a movable table constituted by a long block member of substantially U-shaped cross-section disposed so as to straddle said track shafts, said movable table being provided with longitudinal recesses respectively formed in the opposing inner surfaces of skirt portions thereof;

a pair of right and left bearing bodies each constituted by a long block member of substantially triangular cross-section which is screwed to the corresponding recess in said movable table, each bearing body having a pair of guide ridges respectively projecting from both side edges of an inner inclined surface portion of said block body, each guide ridge having one side surface thereof defined as a loaded roller rolling surface confronting the corresponding loaded roller rolling surface of the associated track shaft and the other side surface defined as a non-loaded roller rolling surface;

cylindrical rollers adapted to be recirculated along said loaded roller rolling surfaces and non-loaded roller rolling surfaces of said bearing bodies and to come in contact with said loaded roller rolling surfaces on said track shafts when rolling along said loaded roller rolling surfaces on said bearing bodies; and a roller retainer attached to each of said guide ridges so as to face the corresponding inner inclined surface portion of the associated bearing body and adapted to guide said rollers so that they can recirculate through the space defined between said roller retainer and inner inclined surface portion, wherein said rollers in the state of serving as loaded rollers are brought into contact with said loaded roller rolling surfaces on said track shafts at a contact angle of about 45°, within the same plane, with respect to corresponding imaginary oblique lines each passing through the center of said ridge of the associated track shaft and intersecting the horizontal axis of said linear slide roller bearing unit at an angle of about 45°.

5. A linear slide roller bearing unit according to claim 4, wherein each roller retainer is provided at the free end of its inner surface portion with a retaining projection for retaining the outer periphery of each of said barrel-shaped rollers, and wherein each bearing body has a mounting member of substantially U-shaped cross-section screwed to the inner recess thereof at an intermediate position between the associated roller retainers, said mounting member extending longitudinally and serving to rollably retain the inner periphery of each of said cylindrical rollers.

6. A linear slide roller bearing unit according to either one of claims 4 or 5, wherein said loaded roller rolling surfaces are communicated with their corresponding non-loaded roller rolling surfaces through semicircular roller turning portions formed on both end surfaces of each of said guide ridges, thereby constituting roller recirculating passages, respectively, and wherein each of said loaded roller rolling surfaces, non-loaded roller rolling surfaces and roller turning portions is constituted by a flat surface corresponding to the outer peripheral surface of said cylindrical rollers.

* * * * *

UNITED STATES PATENT AND TRADEMARK OFFICE
CERTIFICATE OF CORRECTION

PATENT NO. : 4,518,206
DATED : May 21, 1985
INVENTOR(S) : HIROSHI TERAMACHI

It is certified that error appears in the above-identified patent and that said Letters Patent is hereby corrected as shown below:

On the cover page, after Item [22], insert

--- [30]   Foreign Application Priority Data

May 26, 1983 [JP]   Japan............ 58/92016 ---.

*Signed and Sealed this*

*Twenty-fourth* Day of *September 1985*

[SEAL]

*Attest:*

DONALD J. QUIGG

*Attesting Officer*   *Commissioner of Patents and Trademarks—Designate*